United States Patent
Kim et al.

(10) Patent No.: US 9,190,677 B2
(45) Date of Patent: Nov. 17, 2015

(54) MEMBRANE HUMIDIFIER

(71) Applicant: KOLON INDUSTRIES, INC., Gwacheon-si, Gyeonggi-do (KR)

(72) Inventors: Kyoung Ju Kim, Yongin-si (KR); Young Seok Oh, Yongin-si (KR); Moo Seok Lee, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 127 days.

(21) Appl. No.: 14/001,751

(22) PCT Filed: Dec. 28, 2012

(86) PCT No.: PCT/KR2012/011665
§ 371 (c)(1),
(2) Date: Aug. 27, 2013

(87) PCT Pub. No.: WO2013/100677
PCT Pub. Date: Jul. 4, 2013

(65) Prior Publication Data
US 2014/0291874 A1 Oct. 2, 2014

(30) Foreign Application Priority Data
Dec. 29, 2011 (KR) .................. 10-2011-0146469

(51) Int. Cl.
*B01F 3/04* (2006.01)
*H01M 8/04* (2006.01)
*B01D 63/02* (2006.01)
*F24F 6/04* (2006.01)

(52) U.S. Cl.
CPC ............ *H01M 8/04126* (2013.01); *B01D 63/02* (2013.01); *B01D 63/022* (2013.01); *B01F 3/04* (2013.01); *F24F 6/04* (2013.01); *H01M 8/04149* (2013.01); *B01D 2313/04* (2013.01); *H01M 8/04141* (2013.01); *Y02E 60/50* (2013.01)

(58) Field of Classification Search
CPC ........................................................ B01F 3/04
USPC .............. 210/321.8, 500.23; 261/94, 95, 100, 261/101
See application file for complete search history.

(56) References Cited

U.S. PATENT DOCUMENTS

| | | | | |
|---|---|---|---|---|
| 4,334,993 | A | * | 6/1982 | Norton ...................... 210/321.8 |
| 4,708,796 | A | | 11/1987 | Yoshimoto et al. |
| 2008/0152893 | A1 | * | 6/2008 | Stroh et al. ................. 428/313.9 |
| 2011/0000842 | A1 | | 1/2011 | Takagi |

FOREIGN PATENT DOCUMENTS

| | | |
|---|---|---|
| JP | 8-229359 A | 9/1996 |
| JP | 2009-202112 A | 9/2009 |
| JP | 2009208013 A | 9/2009 |
| JP | 2010515412 A | 5/2010 |
| JP | 2010-184228 A | 8/2010 |
| WO | 2008080660 A1 | 7/2008 |

* cited by examiner

Primary Examiner — Robert A Hopkins
(74) Attorney, Agent, or Firm — Sughrue Mion, PLLC

(57) ABSTRACT

A membrane humidifier is disclosed. The membrane humidifier may include: a housing in which a hollow fiber membrane bundle is mounted, the hollow fiber membrane bundle being formed by integrating a plurality of hollow fiber membranes; a potting portion fixing an end portion of the hollow fiber membrane bundle to the housing and coupled to an end portion of the housing so as to hermetically seal the housing; and a sealing member disposed between the housing and the potting portion and hermetically sealing the housing.

14 Claims, 12 Drawing Sheets

MEMBRANE HUMIDIFIER

CROSS-REFERENCE TO RELATED APPLICATION

This application claims priority to and the benefit of Korean Patent Application No. 10-2011-0146469 filed in the Korean Intellectual Property Office on Dec. 29, 2011, the entire contents of which are incorporated herein by reference.

BACKGROUND OF THE INVENTION (a) Field of the Invention

The present invention relates to a membrane humidifier. More particularly, the present invention relates to a membrane humidifier having a sealing member interposed between a housing and a potting portion fixing an end portion of a hollow fiber membrane bundle to the housing.

(b) Description of the Related Art

A membrane humidifier may use a hollow fiber membrane, and includes a housing and a hollow fiber membrane module mounted in the housing. Operation of the humidifier using the hollow fiber membrane may be affected by external environment. Particularly, the humidifier applied to a fuel cell system for a vehicle should be operated stably in a low-temperature region and a high-temperature region.

A conventional humidifier further includes a potting portion which integrates end portions of hollow fiber membranes and fixing the end portions of the hollow fiber membranes to the housing. Since heat strain of the potting portion, however, is larger than that of the housing, the potting portion may be separated from the housing or the housing may be broken in a low-temperature or a high-temperature environment. In this case, gas in the housing may leak.

PRIOR ART DOCUMENTS

Patent Documents (Patent document 0001) Korean Patent Laid-Open Publication No. 10-2009-0013304, Feb. 5, 2009
(Patent document 0002) Korean Patent Laid-Open Publication No. 10-2009-0057773, Jun. 8, 2009
(Patent document 0003) Korean Patent Laid-Open Publication No. 10-2009-0128005, Dec. 15, 2009
(Patent document 0004) Korean Patent Laid-Open Publication No. 10-2010-0108092, Oct. 6, 2010
(Patent document 0005) Korean Patent Laid-Open Publication No. 10-2010-0131631, Dec. 16, 2010
(Patent document 0006) Korean Patent Laid-Open Publication No. 10-2011-0001022, Jan. 6, 2011
(Patent document 0007) Korean Patent Laid-Open Publication No. 10-2011-0006122, Jan. 20, 2011
(Patent document 0008) Korean Patent Laid-Open Publication No. 10-2011-0006128, Jan. 20, 2011
(Patent document 0009) Korean Patent Laid-Open Publication No. 10-2011-0021217, Mar. 4, 2011
(Patent document 0010) Korean Patent Laid-Open Publication No. 10-2011-0026696, Mar. 16, 2011
(Patent document 0011) Korean Patent Laid-Open Publication No. 10-2011-0063366, Jun. 10, 2011

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a membrane humidifier having advantages of securing cohesion of a potting portion which fixing a housing and a hollow fiber membrane in spite of temperature change.

A membrane humidifier in various aspects of the present invention may include: a housing in which a hollow fiber membrane bundle is mounted, the hollow fiber membrane bundle being formed by integrating a plurality of hollow fiber membranes; a potting portion fixing an end portion of the hollow fiber membrane bundle to the housing and coupled to an end portion of the housing so as to hermetically seal the housing; and a sealing member disposed between the housing and the potting portion and hermetically sealing the housing.

The housing may include: a hollow receiving portion for mounting the hollow fiber membrane bundle therein; and an outer wall disposed so as to enclose an end portion of the receiving portion, wherein the sealing member is disposed between an interior circumference of the outer wall and the potting portion.

The membrane humidifier may further include a cover coupled to an end portion of the outer wall, wherein the sealing member is disposed between the cover, the outer wall and the potting portion.

In one or more exemplary embodiments, the sealing member may include: a solid-state sealing element mounted at the end portion of the housing; and a liquid-state sealing element mounted between the solid-state sealing element, the end portion of the housing and the potting portion so as to couple the solid-state sealing element, the housing and the potting portion resiliently.

In one or more exemplary embodiments, the solid-state sealing element may include: a sealing body mounted at an end of the housing; and a first protruding portion protruded from the sealing body in a length direction of the housing and disposed between an interior circumference of the end portion of the housing and the liquid-state sealing element.

In one or more exemplary embodiments, the solid-state sealing element may further include a second protruding portion protruded from the sealing body in the length direction of the housing, wherein the end portion of the housing is positioned between the first protruding portion and the second protruding portion.

In one or more exemplary embodiments, the sealing body may include a groove formed on the opposite side of the first protruding portion.

In one or more exemplary embodiments, the sealing body may include at least one crease which can be folded or unfolded.

In one or more exemplary embodiments, the sealing member may include: a sealing body mounted at an end of the housing; a first protruding portion protruded from the sealing body in a length direction of the housing and closely contacting with an interior circumference of the end portion of the housing; and at least one lip extending from the first protruding portion toward the potting portion and resiliently contacting with an external circumferential surface of the potting portion.

In one or more exemplary embodiments, the sealing member may further include a second protruding portion protruded from the sealing body in the length direction of the housing, wherein the end portion of the housing is positioned between the first protruding portion and the second protruding portion.

In one or more exemplary embodiments, the at least one lip may extend slantedly to the length direction of the housing in a straight form.

In one or more exemplary embodiments, the at least one lip may extend slanted to the length direction of the housing in a curved form.

In one or more exemplary embodiments, the sealing member may include: a sealing body mounted at an end of the housing; and a first protruding portion protruded from the sealing body in a length direction of the housing, having a predetermined thickness, and disposed between an interior circumference of the end portion of the housing and an external circumferential surface of the potting portion.

In one or more exemplary embodiments, the sealing member may further include at least one rib protruded radially inwardly from an interior circumference of the first protruding portion.

In one or more exemplary embodiments, cross-section of the rib in the length direction may be a trapezoid.

In one or more exemplary embodiments, the sealing member may further include a second protruding portion protruded from the sealing body in the length direction of the housing, wherein the end portion of the housing is positioned between the first protruding portion and the second protruding portion.

In one or more exemplary embodiments, the sealing member may be formed as a sheet of flexible material, wherein the sealing member is interposed between the housing and the potting portion by pouring the liquid-state potting portion after the sealing member is positioned on the interior circumference of the end portion of the housing and hardening the liquid-state potting portion.

Since a difference between thermal deformations of the potting portion and the housing is absorbed by the sealing member, air-tightness of the housing may be secured in a severe temperature condition such as polar regions and tropics according to exemplary embodiments of the present invention. Therefore, the membrane humidifier may be operated stably regardless of external environment.

DETAILED DESCRIPTION OF THE EMBODIMENTS

Figure 1:
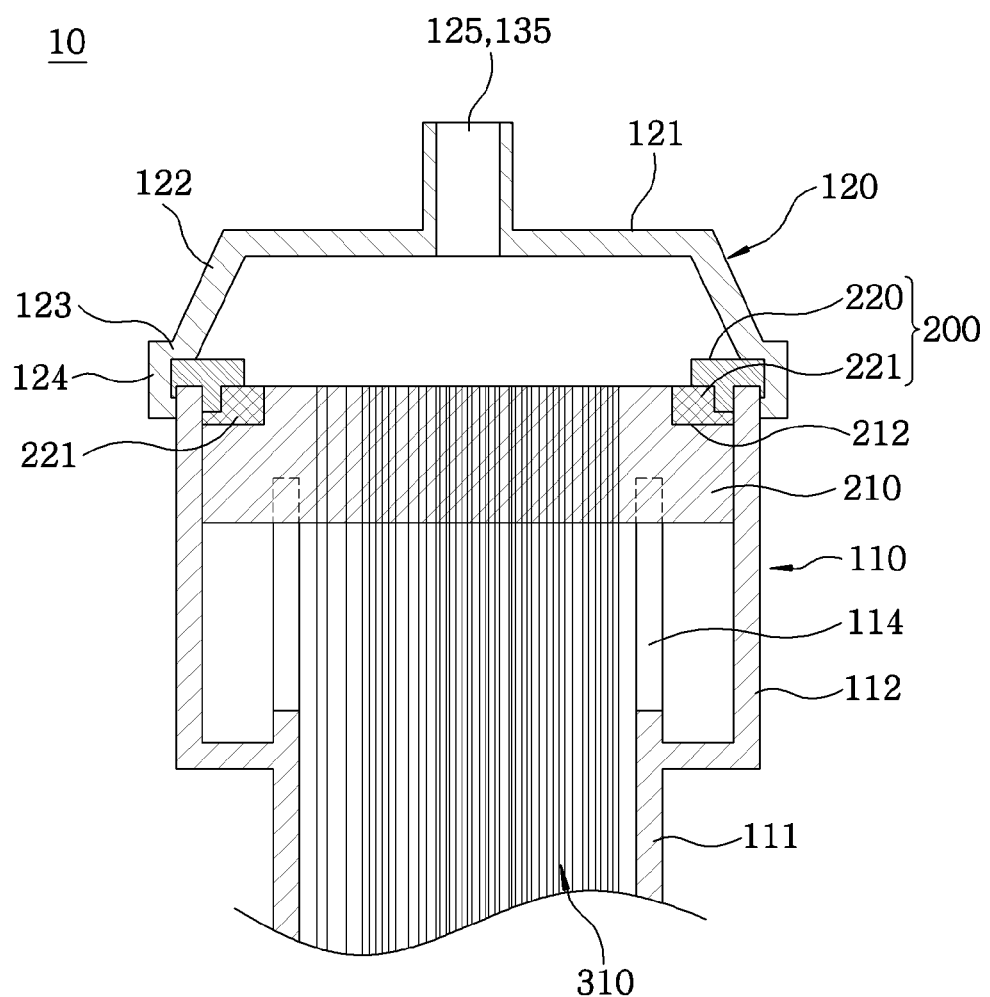
FIG. 1 is a partial cross-sectional view of a membrane humidifier according to the first exemplary embodiment of the present invention.

Exemplary embodiments of the present invention will hereinafter be described in detail so as to be easily executed by a person of an ordinary skill in the art. However, the present invention will be realized in various embodiments and is not limited to the exemplary embodiments described herein.

A membrane humidifier according to an exemplary embodiment of the present invention can be used in a fuel cell system. For better comprehension and ease of description, the membrane humidifier used in the fuel cell system will hereinafter be described. However, sprits of the present invention will not be limited to the membrane humidifier used in the fuel cell system.

The humidifier for a fuel cell is adapted to supply moisture to dried fuel gas or dried operating gas using humidified air discharged from the fuel cell. As known to the art, the fuel gas or the operating gas passes through a passage formed in a hollow fiber membrane, the humidified air passes the exterior of the hollow fiber membrane, and the moisture in the humidified air penetrates the hollow fiber membrane due to water permeability of hollow fiber membrane and is supplied to the fuel gas or the operating gas.

For better comprehension and ease of description, air discharged from the fuel cell and containing a large amount of moisture will be called humidified gas, and fuel gas or operating gas humidified by the humidified gas will be called operating gas.

A hollow fiber membrane bundle is mounted in a housing forming an appearance, and both ends of hollow fiber membranes are fixed in the housing by a potting portion formed by hardening synthetic resin. That is, in a state that the hollow fiber membrane bundle is inserted in the housing, the liquid-state synthetic resin is poured in the housing and is hardened so as to form the potting portion. The liquid-state synthetic resin fills gaps between the hollow fiber membranes and is bond to an interior circumference of the housing.

A sealing member is disposed between the housing and the potting portion.

The housing is typically made of hard plastic such as polycarbonate or metal, and the potting portion is formed by hardening the liquid-state synthetic resin such as polyurethane, epoxy, or silicon resin.

Since the housing and the potting portion are made of different materials, heat strains of the housing and the potting portion differ from each other. Therefore, the potting portion is contracted or expanded more than the housing in low temperature or high temperature. In this case, the potting portion may be separated from the housing or the housing may be broken. The sealing member according to an exemplary embodiment of the present invention absorbs a difference between thermal deformations of the potting portion and the housing so as to couple the potting portion and the housing strongly.

The sealing member is interposed between the housing and the potting portion and hermetically seals the housing. The sealing member may be inserted in the potting portion or may be positioned in a sealing recess formed at an edge of the potting portion.

In one or more exemplary embodiments, the sealing member may include a liquid-state sealing element and a solid-state sealing element. The solid-state sealing element is made of silicon, acryl rubber, EPDM, or NBR, and the liquid-state sealing element is made of silicon or urethane.

In one or more exemplary embodiments, the sealing member may include only the solid-state sealing element, and the solid-state sealing element may include at least one lip. That is, the solid-state sealing element is inserted in the sealing recess formed at the edge of the potting portion, and the at least one lip is extended from the solid-state sealing element toward the potting portion and is resiliently contacted with an external circumferential surface of the potting portion.

In one or more exemplary embodiments, the sealing member is formed as a sheet of flexible material. After the sheet is positioned in the housing, the liquid-state potting portion is poured and is hardened. In this case, the sheet is adapted to absorb deformation of the potting portion. The sheet should be bonded to the potting portion well.

Hereinafter, the membrane humidifier according to exemplary embodiments of the present invention will be described in detail with reference to the accompanying drawings.

Figure 2:
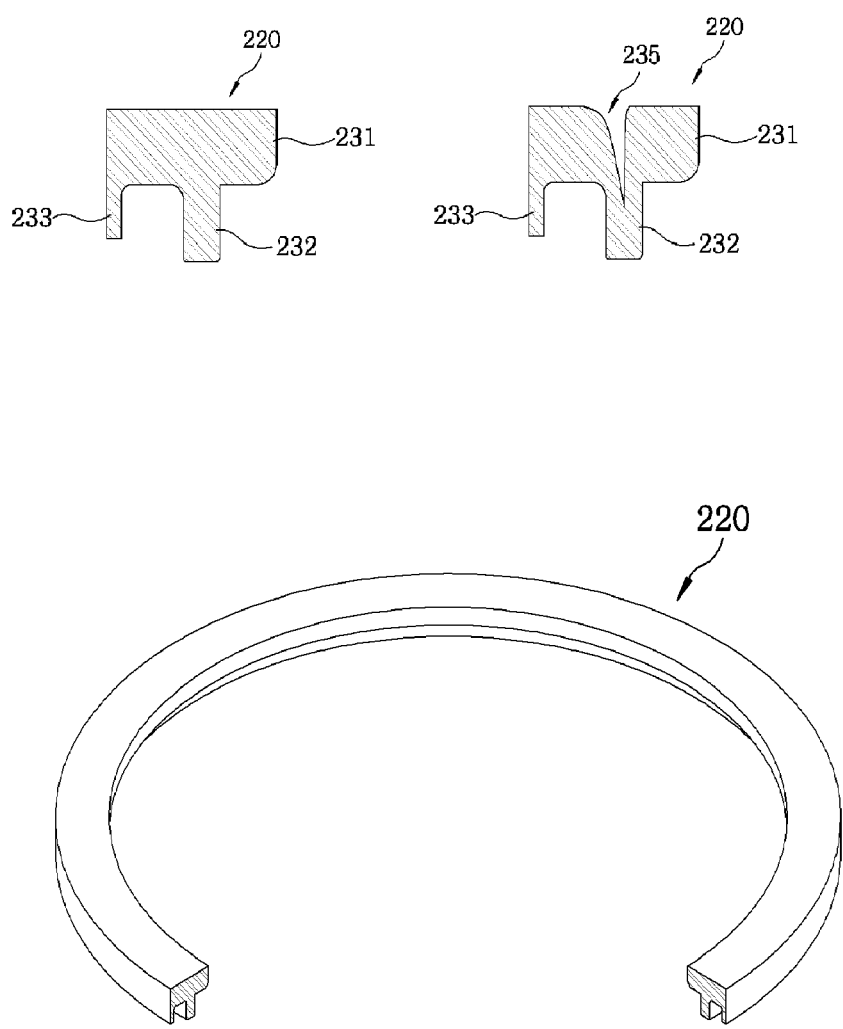
FIG. 2 is a cross-sectional view and a perspective view of an exemplary sealing member applicable to a membrane humidifier according to the first exemplary embodiment of the present invention.
Figure 3:
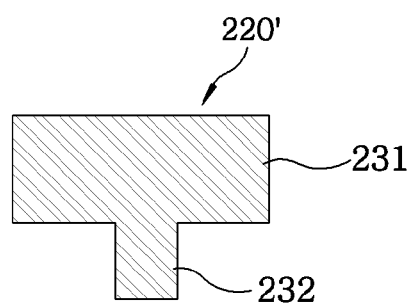
FIG. 3 is a cross-sectional view and a perspective view of another exemplary sealing member applicable to a membrane humidifier according to the first exemplary embodiment of the present invention.
Figure 3:
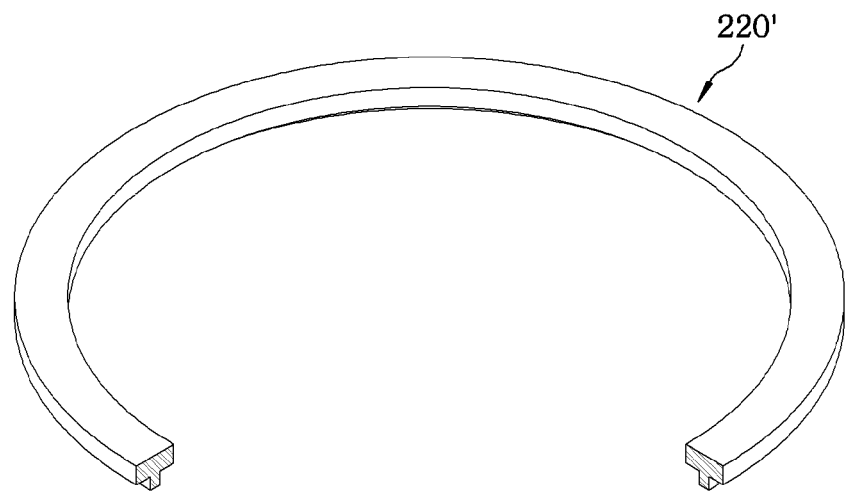
Figure 4:
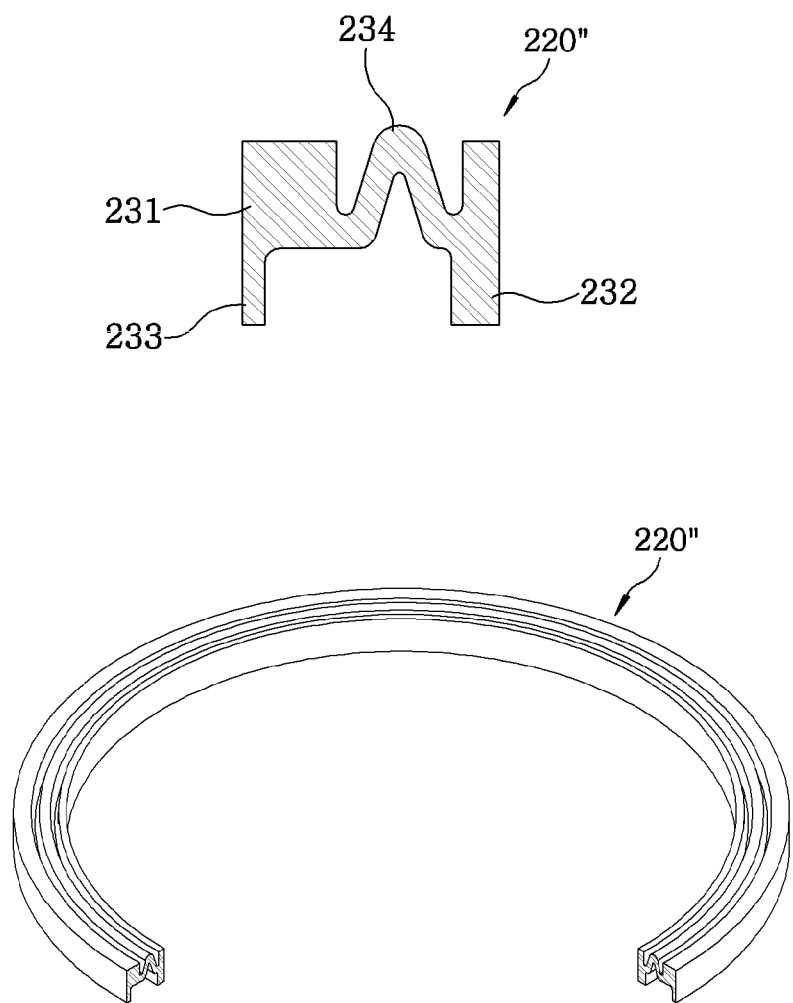
FIG. 4 is a cross-sectional view and a perspective view of other exemplary sealing member applicable to a membrane humidifier according to the first exemplary embodiment of the present invention.

FIG. 1 is a partial cross-sectional view of a membrane humidifier according to the first exemplary embodiment of the present invention, and FIG. 2 to FIG. 4 are cross-sectional views and perspective views of sealing members applicable to the membrane humidifier according to the first exemplary embodiment of the present invention.

A side portion of the membrane humidifier according to the first exemplary embodiment of the present invention is illustrated in FIG. 1. Since the other side portion of the membrane humidifier is the same as or is similar to the side portion of the membrane humidifier, only the side portion of the membrane humidifier will be described.

As shown in FIG. 1, the membrane humidifier 10 according to the first exemplary embodiment of the present invention includes a housing 110, a cover 120, a hollow fiber membrane bundle 310, a potting portion 210 and a sealing member 200.

The housing 110 and the cover 120 form a shape of the membrane humidifier 10 and are made of hard plastic such as polycarbonate or metal.

The housing 110 has a cylindrical shape substantially and includes a receiving portion 111 and an outer wall 112.

A hollow space is formed in the receiving portion 111, and a through-hole 114 is formed at an end portion of the receiving portion 111.

The outer wall 112 is formed integrally with the receiving portion 111 and encloses the end portion of the receiving portion 111 and the through-hole 114. An input port (not shown) into which humidified gas is flowed or an output port (not shown) from which the humidified gas is discharged is formed at the outer wall 112. Therefore, the humidified gas supplied to the input port passes through the through-hole 114 and flows in the receiving portion 111 so as to supply moisture to the operating gas passing in the hollow fiber membranes. After that, the humidified gas in the receiving portion 111 flows into a space between the outer wall 112 and the receiving portion 111 through the through-hole 114, and is discharged to the exterior of the membrane humidifier 10 through the output port.

The cover 120 is coupled to the outer wall 112 of the housing 110 and includes a front surface 121, a conical portion 122, a connecting portion 123 and a coupling portion 125.

The front surface 121 has a flat disk shape, and an inlet 125 for receiving the operating gas or an outlet 135 for discharging the operating gas to which the moisture is supplied is formed at the front surface 121. Therefore, the operating gas flowing in through the inlet 125 passes through a passage formed in the hollow fiber membrane and is discharged through the outlet 135. When the operating gas passes through the passage formed in the hollow fiber membrane, the moisture is supplied to the operating gas through the hollow fiber membrane.

The conical portion 122 is extended from the front surface 121 toward the housing 110, and an end of the conical portion 122 is connected to the front surface 121. A diameter of the conical portion 122 becomes larger from the front surface 121 to the connecting portion 123.

The connecting portion 123 is connected to the other end of the conical portion 122 and extends radially outwardly so as to be parallel with the front surface 121.

The coupling portion 125 extends from the connecting portion 123 in the length direction of the housing 110 and is coupled to the outer wall 112.

The hollow fiber membrane bundle 310 is mounted in the receiving portion 111 of the housing 110. The hollow fiber membrane selectively passes the moisture. Material and structure of the hollow fiber membrane are well known to a person of an ordinary skill in the art, and thus detailed description of the hollow fiber membrane will be omitted in this specification. A plurality of hollow fiber membranes is integrated in the hollow fiber membrane bundle 310.

The potting portion 210 connects end portions of the hollow fiber membranes with each other and fills gaps between the hollow fiber membranes. In addition, the potting portion 210 is bonded to an interior circumference of an end portion of the outer wall 112 such that the operating gas flowing into a space between the potting portion 210 and the cover 120 and the humidified gas flowing into a space between the potting portion 210 and the housing 110 are not mixed with each other.

As described above, the potting portion 210 is formed by hardening liquid-state synthetic resin such as polyurethane, epoxy, or silicon resin. That is, if the liquid-state potting portion 210 is injected into the end portion of the housing 110, the liquid-state potting portion 210 fills the gaps between the hollow fiber membranes and is bonded to the interior circumference of the outer wall 112. At this state, if the liquid-state potting portion 210 is hardened, the potting portion 210 is bonded to the interior circumference of the outer wall 112.

On the contrary, the potting portion 210 may be hardened at an additional jig, and the hardened potting portion 210 may be press-fitted to the interior circumference of the outer wall 112 in extremely cold temperature. After that, as a temperature of the potting portion 210 rises, the potting portion 210 is expanded and is closely fitted in the interior circumference of the outer wall 112.

Since a pair of potting portions 210 is bonded to both ends of the housing 110, both end portions of the hollow fiber membrane bundle 310 are fixed to the housing 110.

As described above, a sealing recess 212 is formed at an edge of the potting portion 210.

The sealing member 200, as shown in FIG. 1 and FIG. 2, is interposed between the outer wall 112 and the potting portion 210 and hermetically seals the housing 110. Particularly, the sealing member 200 is positioned in the sealing recess 212 formed at the potting portion 210. In the first exemplary embodiment of the present invention, the sealing member 200 includes a solid-state sealing element 220 and a liquid-state sealing element 221. Particularly, the liquid-state sealing element 221 is adapted to absorb a difference between thermal deformations of the potting portion 210 and the housing 110.

The solid-state sealing element 220 is mounted at the end portion of the outer wall 112, and the liquid-state sealing element 221 is mounted between the solid-state sealing element 220, the end portion of the outer wall 112 and the potting portion 210 so as to resiliently couple the solid-state sealing element 220, the outer wall 112, and the potting portion 210. The solid-state sealing element 220 is made of silicon, acryl rubber, EPDM, or NBR, and the liquid-state sealing element 221 is made of silicon or urethane.

As shown in FIG. 1 and FIG. 2, the solid-state sealing element 220 includes a sealing body 231 mounted between an end of the outer wall 112 and the connecting portion 123 of the cover 120, a first protruding portion 232 protruded from the sealing body 231 in the length direction of the housing 110 and disposed between an interior circumference of the end portion of the outer wall 112 and the liquid-state sealing element 221, and a second protruding portion 233 protruded from the sealing body 231 in the length direction of the housing 110 and disposed between an external circumferential surface of the end portion of the outer wall 112 and the coupling portion 124 of the cover 120. Therefore, the end portion of the outer wall 112 is positioned between the first protruding portion 232 and the second protruding portion 233.

Meanwhile, a groove 235 may be formed on the opposite side of the first protruding portion 232. The groove 235 may be formed to burrow into the first protruding portion 232. The groove 235 can absorb deformation of the potting portion 210.

In addition, since the liquid-state sealing element 221 is positioned between the first protruding portion 232 and the potting portion 210, the liquid-state sealing element 221 can absorb the difference between the thermal deformations of the housing 110 and the potting portion 210.

Another example of the sealing member 200 according to the first exemplary embodiment of the present invention is illustrated in FIG. 3. The second protruding portion 233 is not included in the solid-state sealing element 220' shown in FIG. 3. Since other elements of the solid-state sealing element 220' shown in FIG. 3 are the same as those of the solid-state sealing element 220 shown in FIG. 2, detailed description thereof will be omitted.

The other example of the sealing member 200 according to the first exemplary embodiment of the present invention is illustrated in FIG. 4. The sealing body 231 of the solid-state sealing element 220" shown in FIG. 4 includes at least one crease 234 which can be folded or unfolded. Since other elements of the solid-state sealing element 220" shown in FIG. 4 are the same as those of the solid-state sealing element 220 shown in FIG. 2, detailed description thereof will be omitted.

Figure 5:
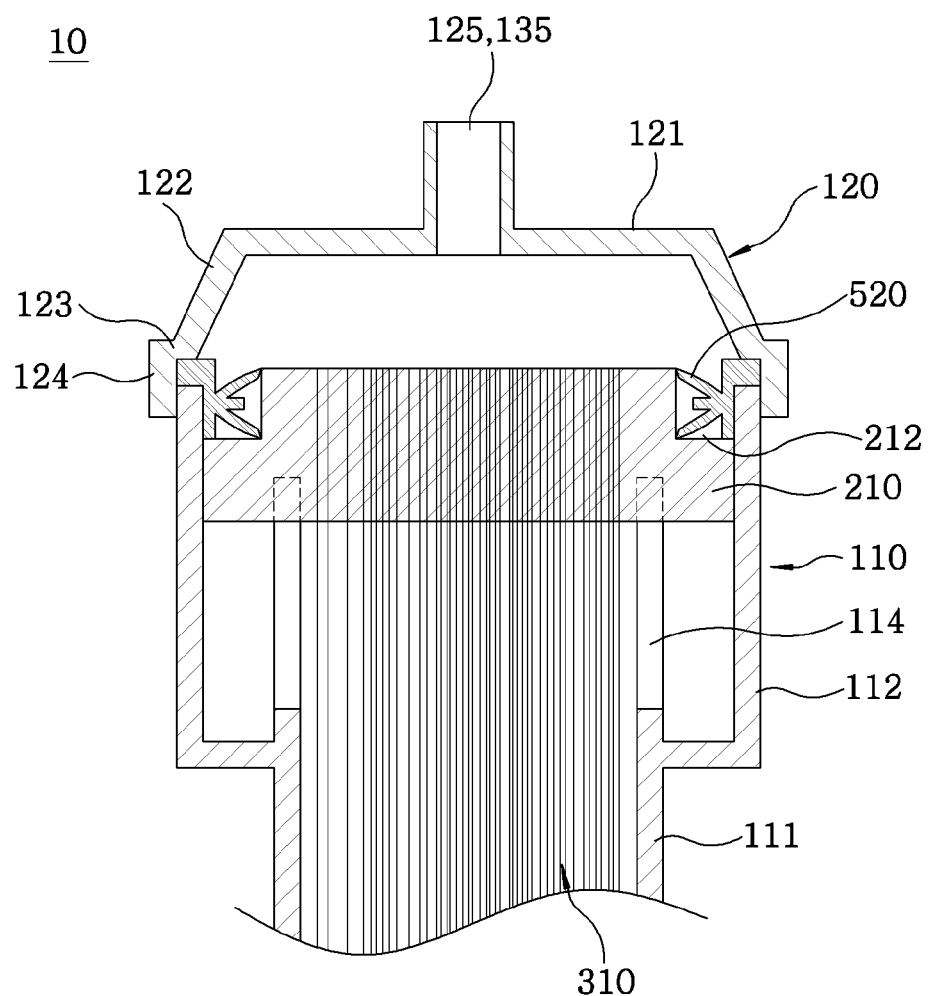
FIG. 5 is a partial cross-sectional view of a membrane humidifier according to the second exemplary embodiment of the present invention.
Figure 6:
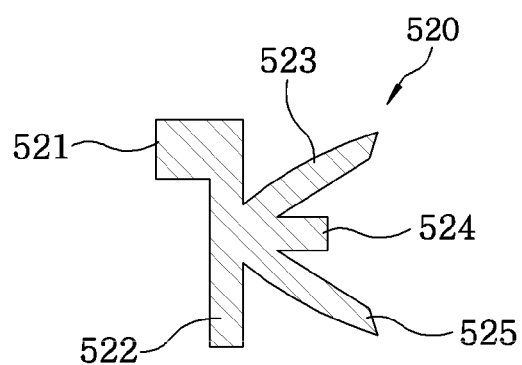
FIG. 6 is a cross-sectional view and a perspective view of an exemplary sealing member applicable to a membrane humidifier according to the second exemplary embodiment of the present invention.
Figure 6:
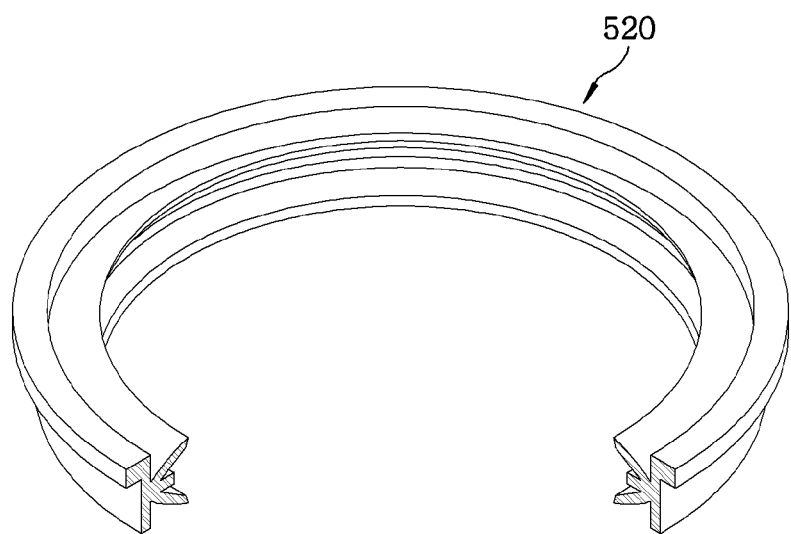
Figure 7:
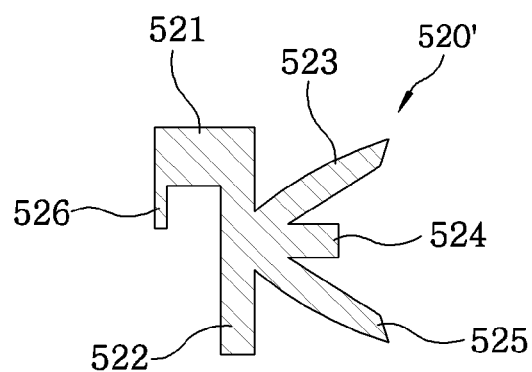
FIG. 7 is a cross-sectional view and a perspective view of another exemplary sealing member applicable to a membrane humidifier according to the second exemplary embodiment of the present invention.
Figure 7:
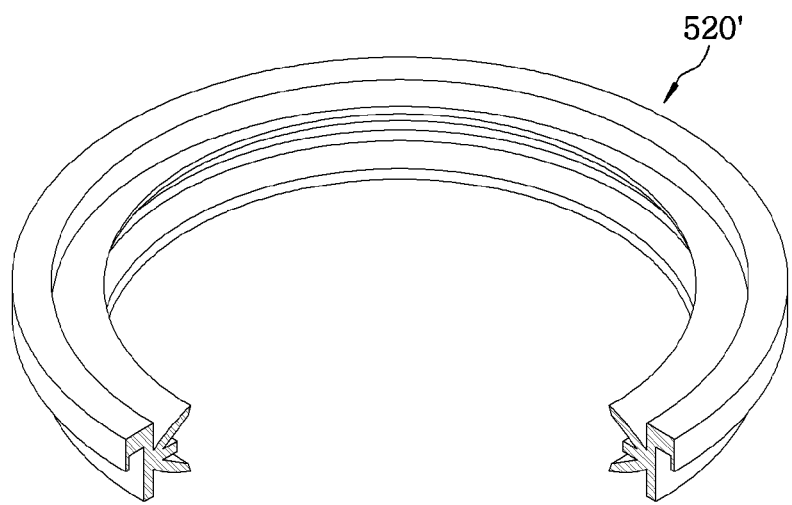
Figure 8:
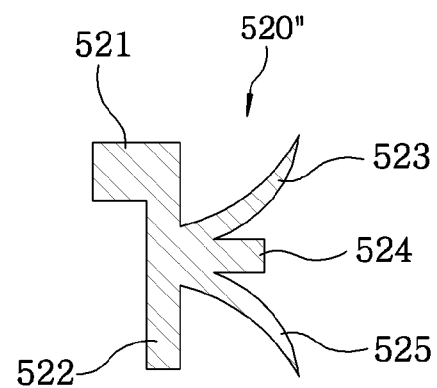
FIG. 8 is a cross-sectional view and a perspective view of other exemplary sealing member applicable to a membrane humidifier according to the second exemplary embodiment of the present invention.
Figure 8:
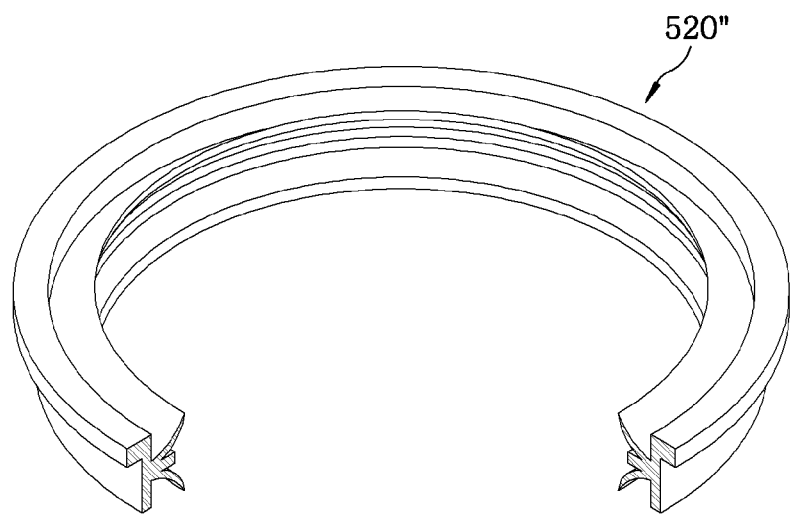

FIG. 5 is a partial cross-sectional view of a membrane humidifier according to the second exemplary embodiment of the present invention, and FIG. 6 to FIG. 8 are cross-sectional views and perspective views of the sealing members applicable to the membrane humidifier according to the second exemplary embodiment of the present invention.

As shown in FIG. 5, the membrane humidifier 10 according to the second exemplary embodiment of the present invention is the same as the membrane humidifier 10 according to the first exemplary embodiment of the present invention except the sealing member 520. Therefore, only the sealing member 520 will be described in detail.

As shown in FIG. 5, the sealing member 520 according to the second exemplary embodiment of the present invention includes only the solid-state sealing element. Instead, the sealing member 520 has a structure for absorbing the difference between the thermal deformations of the housing 110 and the potting portion 210.

As shown in FIG. 5 and FIG. 6, the sealing member 520 according to the second exemplary embodiment of the present invention includes a sealing body 521, a first protruding portion 522 and at least one lip 523, 524, and 525.

The sealing body 521 is mounted between the end of the outer wall 112 and the connecting portion 123 of the cover 120.

The first protruding portion 522 is protruded from the sealing body 521 in the length direction of the housing 110 and is closely contacted with the interior circumference of the end portion of the outer wall 112.

At least one lip 523, 524, and 525 is extended from an interior circumference of the first protruding portion 522 toward the potting portion 210 and includes a first lip 523, a second lip 524 and a third lip 525.

The first and third lips 523 and 525 resiliently contact with an external circumferential surface of the potting portion 210 and absorb the difference between the thermal deformations of the housing 110 and the potting portion 210. For this purpose, the first and third lips 523 and 525 are extended slantedly to a radial direction.

The second lip 524 does not contact with the external circumferential surface of the potting portion 210. When the potting portion 210 deforms more than the housing 110, the second lip 524 supports the potting portion 210 and prevents breakage of the first and third lips 523 and 525.

Meanwhile, the first and third lips 523 and 525 are extended in a straight form.

Another example of the sealing member 520' according to the second exemplary embodiment of the present invention is illustrated in FIG. 7. The sealing member 520' shown in FIG. 7 further includes the second protruding portion 526. The second protruding portion 526 is protruded from the sealing body 521 in the length direction of the housing 110, and is disposed between the external circumferential surface of the end portion of the outer wall 112 and the coupling portion 124 of the cover 120. Therefore, the end portion of the outer wall 112 is disposed between the first protruding portion 522 and the second protruding portion 526.

Since other elements of the sealing member 520' shown in FIG. 7 are the same as those of the sealing member 520 shown in FIG. 6, detailed description thereof will be omitted.

The other example of the sealing member 520" according to the second exemplary embodiment of the present invention is illustrated in FIG. 8. The first and third lips 523 and 525 of the sealing member 520" shown in FIG. 8 are extended in a curved form. Since other elements of the sealing member 520" shown in FIG. 8 are the same as those of the sealing member 520 shown in FIG. 6, detailed description thereof will be omitted.

Figure 9:
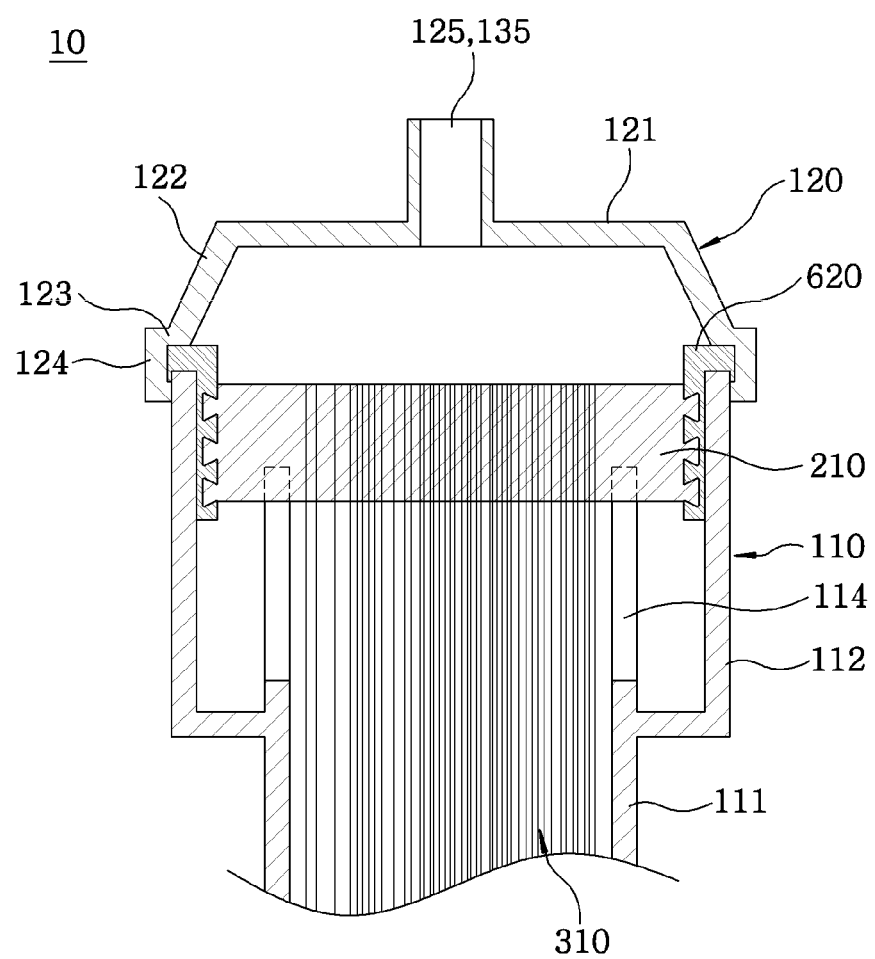
FIG. 9 is a partial cross-sectional view of a membrane humidifier according to the third exemplary embodiment of the present invention.
Figure 10:
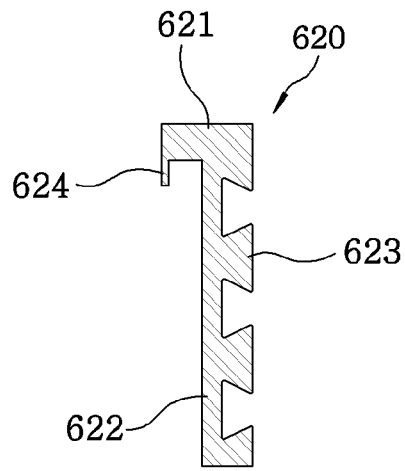
FIG. 10 is a cross-sectional view and a perspective view of an exemplary sealing member applicable to a membrane humidifier according to the third exemplary embodiment of the present invention.
Figure 10:
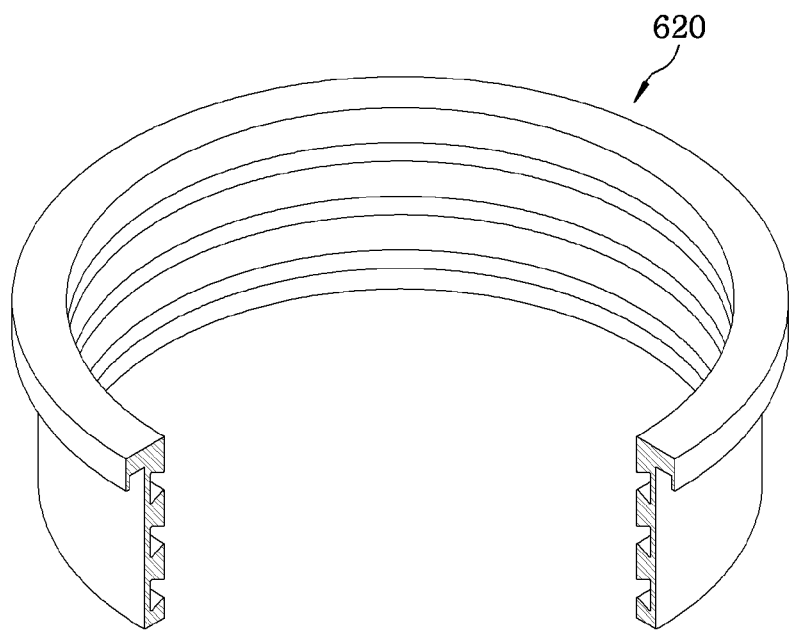
Figure 11:
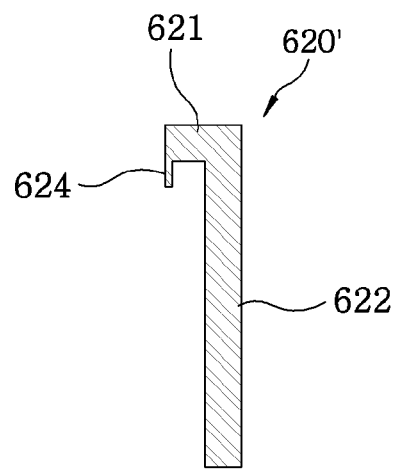
FIG. 11 is a cross-sectional view and a perspective view of another exemplary sealing member applicable to a membrane humidifier according to the third exemplary embodiment of the present invention.
Figure 11:
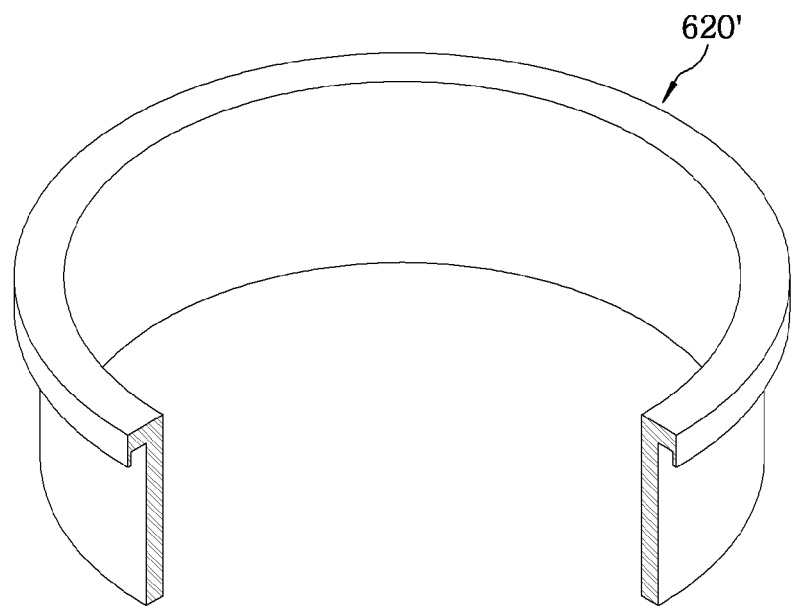
Figure 12:
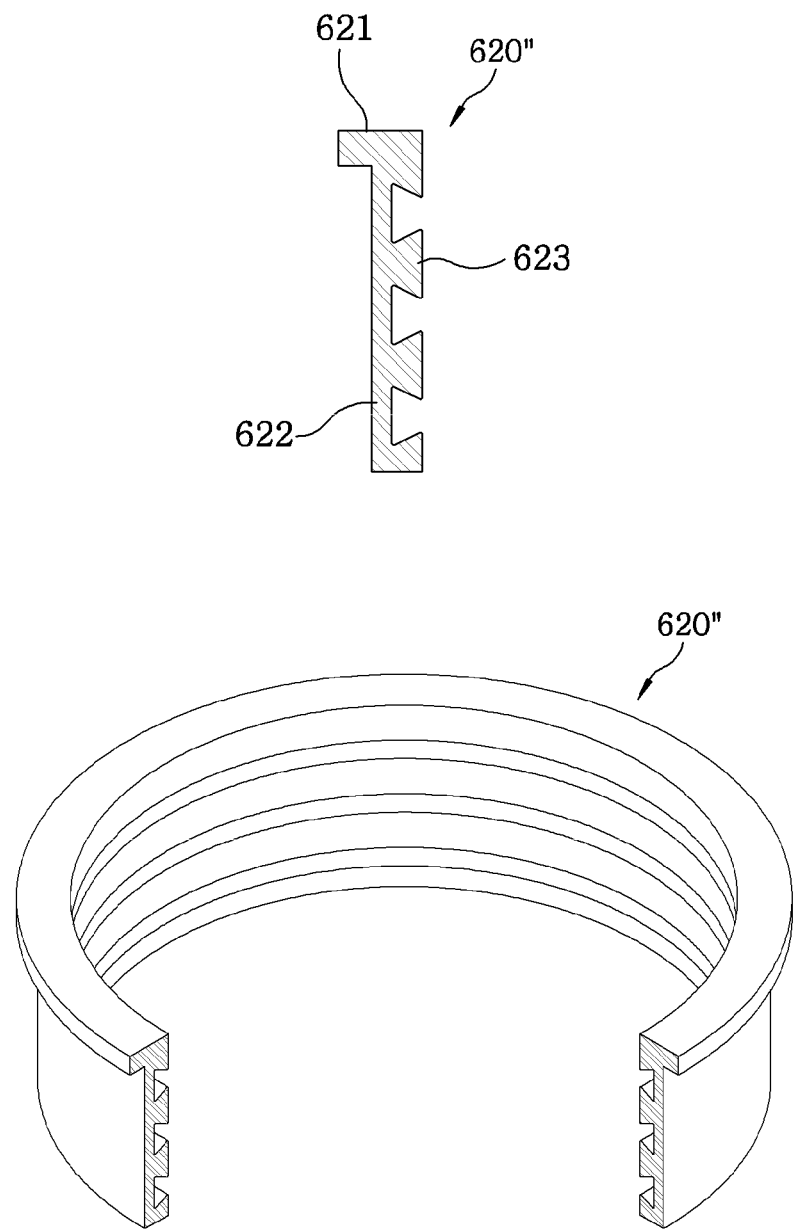
FIG. 12 is a cross-sectional view and a perspective view of other exemplary sealing member applicable to a membrane humidifier according to the third exemplary embodiment of the present invention.

FIG. 9 is a partial cross-sectional view of a membrane humidifier according to the third exemplary embodiment of the present invention. FIG. 10 to FIG. 12 are cross-sectional views and perspective views of the sealing members applicable to the membrane humidifier according to the third exemplary embodiment of the present invention.

As shown in FIG. 9, the sealing member 620 according to the third exemplary embodiment of the present invention includes only the solid-state sealing element. instead, the sealing member 620 is formed as a sheet of flexible material and has a predetermined thickness so as to absorb the difference between the thermal deformations of the housing 110 and the potting portion 210.

As shown in FIG. 9 and FIG. 10, the sealing member 620 according to the third exemplary embodiment of the present invention includes a sealing body 621, a first protruding portion 622, at least one rib 623 and a second protruding portion 624.

The sealing body 621 is mounted between the end of the outer wall 112 and the connecting portion 123 of the cover 120.

The first protruding portion 622 is protruded from the sealing body 621 in the length direction of the housing 110 and is closely contacted with the interior circumference of the end portion of the outer wall 112. Since the first protruding portion 622 has the predetermined thickness, the first protruding portion 622 is configured to absorb the difference between the thermal deformations of the housing 110 and the potting portion 210.

The at least one rib 623 is protruded toward the potting portion 210. Since a cross-section of the rib 623 in the length direction is a trapezoid, the rib 623 is configured to absorb the difference between the thermal deformations of the housing 110 and the potting portion 210. In addition, the external circumferential surface of the potting portion 210 has a shape corresponding to the rib 623. That is, the potting portion 210 is formed by pouring and hardening the liquid-state potting portion 210 after the sealing member 620 is positioned at the end portion and the interior circumference of the outer wall 112.

The second protruding portion 624 is protruded from the sealing body 621 in the length direction of the housing 110 and is disposed between the external circumferential surface of the end portion of the outer wall 112 and the coupling portion 124 of the cover 120. Therefore, the end portion of the outer wall 112 is positioned between the first protruding portion 622 and the second protruding portion 624.

Another example of the sealing member 620' according to the third exemplary embodiment of the present invention is illustrated in FIG. 11. The rib 623 is not included in the sealing member 620' shown in FIG. 11. Since other elements of the sealing member 620' shown in FIG. 11 are the same as those of the sealing member 620 shown in FIG. 10, detailed description thereof will be omitted.

The other example of the sealing member 620" according to the third exemplary embodiment of the present invention is illustrated in FIG. 12. The second protruding portion 624 is not included in the sealing member 620" shown in FIG. 12. Since other elements of the sealing member 620" shown in FIG. 12 are the same as those of the sealing member 620 shown in FIG. 10, detailed description thereof will be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A membrane humidifier, comprising:
   a housing in which a hollow fiber membrane bundle is mounted, the hollow fiber membrane bundle being formed by integrating a plurality of hollow fiber membranes;
   a potting portion fixing an end portion of the hollow fiber membrane bundle to the housing and coupled to an end portion of the housing so as to hermetically seal the housing; and
   a sealing member disposed between the housing and the potting portion and hermetically sealing the housing,
   wherein the sealing member comprises:
   a solid-state sealing element mounted at the end portion of the housing; and
   a liquid-state sealing element mounted between the solid-state sealing element, the end portion of the housing and the potting portion so as to couple the solid-state sealing element, the housing and the potting portion resiliently.

2. The membrane humidifier of claim 1, wherein the solid-state sealing element comprises:
   a sealing body mounted at an end of the housing; and
   a first protruding portion protruded from the sealing body in a length direction of the housing and disposed between an interior circumference of the end portion of the housing and the liquid-state sealing element.

3. The membrane humidifier of claim 2, further comprising a second protruding portion protruded from the sealing body in the length direction of the housing,
   wherein the end portion of the housing is positioned between the first protruding portion and the second protruding portion.

4. The membrane humidifier of claim 2, wherein the sealing body comprises a groove formed on the opposite side of the first protruding portion.

5. The membrane humidifier of claim 2, wherein the sealing body comprises at least one crease which can be folded or unfolded.

6. A membrane humidifier, comprising:
   a housing in which a hollow fiber membrane bundle is mounted, the hollow fiber membrane bundle being formed by integrating a plurality of hollow fiber membranes;
   a potting portion fixing an end portion of the hollow fiber membrane bundle to the housing and coupled to an end portion of the housing so as to hermetically seal the housing; and
   a sealing member disposed between the housing and the potting portion and hermetically sealing the housing,
   wherein the sealing member comprises:
   a sealing body mounted at an end of the housing;
   a first protruding portion protruded from the sealing body in a length direction of the housing and closely contacting with an interior circumference of the end portion of the housing; and
   at least one lip extending from the first protruding portion toward the potting portion and resiliently contacting with an external circumferential surface of the potting portion.

7. The membrane humidifier of claim 6, further comprising a second protruding portion protruded from the sealing body in the length direction of the housing,
wherein the end portion of the housing is positioned between the first protruding portion and the second protruding portion.

8. The membrane humidifier of claim 6, wherein the at least one lip extends slantedly to the length direction of the housing in a straight form.

9. The membrane humidifier of claim 6, wherein the at least one lip extends slanted to the length direction of the housing in a curved form.

10. A membrane humidifier, comprising:
a housing in which a hollow fiber membrane bundle is mounted, the hollow fiber membrane bundle being formed by integrating a plurality of hollow fiber membranes;
a potting portion fixing an end portion of the hollow fiber membrane bundle to the housing and coupled to an end portion of the housing so as to hermetically seal the housing; and
a sealing member disposed between the housing and the potting portion and hermetically sealing the housing,
wherein the sealing member comprises:
a sealing body mounted at an end of the housing; and
a first protruding portion protruded from the sealing body in a length direction of the housing, having a predetermined thickness, and disposed between an interior circumference of the end portion of the housing and an external circumferential surface of the potting portion.

11. The membrane humidifier of claim 10, further comprising at least one rib protruded radially inwardly from an interior circumference of the first protruding portion.

12. The membrane humidifier of claim 11, wherein cross-section of the rib in the length direction is a trapezoid.

13. The membrane humidifier of claim 10, further comprising a second protruding portion protruded from the sealing body in the length direction of the housing,
wherein the end portion of the housing is positioned between the first protruding portion and the second protruding portion.

14. The membrane humidifier of claim 10, wherein the sealing member is formed as a sheet of flexible material, and
wherein the sealing member is interposed between the housing and the potting portion by pouring the liquid-state potting portion after the sealing member is positioned on the interior circumference of the end portion of the housing and hardening the liquid-state potting portion.

* * * * *